United States Patent [19]
LaMarca et al.

[11] Patent Number: 6,044,791
[45] Date of Patent: Apr. 4, 2000

[54] APPARATUS FOR DETERMINING THE POSITION OF A ROTARY VALVE

[75] Inventors: Drew LaMarca, Whippany; Gary Kramer, Morris, both of N.J.

[73] Assignee: Automatic Switch Company, Florham Park, N.J.

[21] Appl. No.: 09/032,913

[22] Filed: Mar. 2, 1998

[51] Int. Cl.$^7$ ................................................ F16K 37/00
[52] U.S. Cl. ................................. 116/277; 116/DIG. 21; 340/672; 340/686.1
[58] Field of Search ................................ 116/277, 284, 116/303, 305, DIG. 21; 340/671, 672, 686.1; 137/553, 554, 556.3, 556

[56] References Cited

U.S. PATENT DOCUMENTS

| | | | |
|---|---|---|---|
| 4,494,566 | 1/1985 | Sinclair et al. | 137/556 |
| 4,690,168 | 9/1987 | Kihm | 137/554 |
| 4,718,445 | 1/1988 | Lundberg et al. | 137/15 |
| 5,223,822 | 6/1993 | Stommes et al. | 137/551 |
| 5,278,530 | 1/1994 | Zovath | 335/17 |
| 5,469,805 | 11/1995 | Gibbs | 116/284 |
| 5,535,698 | 7/1996 | Trevisan | 116/277 |
| 5,623,963 | 4/1997 | Stommes et al. | 137/554 |

*Primary Examiner*—Andrew H. Hirshfeld
*Assistant Examiner*—R A Smith
*Attorney, Agent, or Firm*—Levine & Mandelbaum

[57] ABSTRACT

A position indicator for a rotary valve actuator has a stator of one color mountable on a housing for the actuator and a rotor of a contrasting color which is connected to the actuator output shaft for rotation with it. The rotor has inner and outer coaxial cylindrical walls with windows in the outer wall. The stator has a hollow cylindrical wall in the space between the rotor walls. When the windows of the rotor and stator are in registration the inner wall of the rotor is visible and the stator is hidden to indicate one position of the actuator output shaft. When the windows of the rotor and stator are out of registration the inner wall of the rotor is hidden by the stator wall which is visible through the rotor window to indicate another position of the actuator output shaft. A circuit actuator and sensor may be mounted on the rotor and stator for generating electrical signals indicative of the actuator output shaft position in addition to the visual indication.

17 Claims, 6 Drawing Sheets

FIG. 10 ized the APPARATUS FOR DETERMINING THE
APPARATUS FOR DETERMINING THE POSITION OF A ROTARY VALVE

BACKGROUND OF THE INVENTION

This invention relates to position indication for a rotary valve actuator which is used to open or close a rotary valve. More specifically, the invention is directed to apparatus for providing a visual and electrical indication of whether or not a rotary valve is in the open or closed position.

It is known to use pneumatic and hydraulic pressure to operate a rotary valve actuator by applying fluid under pressure to a valve actuator through pneumatic or hydraulic fluid lines. For example, there is known in the art a type of rotary valve actuator having opposing pistons which are coupled to a rack and pinion mechanism for converting pneumatic or hydraulic pressure applied to the pistons to torque for opening and closing a rotary valve.

The rotary valve has a valve member which is directly connected to the output shaft of the rotary actuator and is selectively rotated into and out of the path of fluid flow between the inlet and outlet ports of a valve housing, between open and closed positions which are typically ninety degrees apart. Although the open or closed state of a rotary valve may be indirectly determined by sensing fluid pressure or flow downstream of the valve, it is desirable to have a direct indication of whether a valve is open or closed, independently of fluid flow through the valve. A direct indication of the open or closed state of a rotary valve can be provided from a visual observation of the angular position of the output shaft on the rotary valve actuator relative to a fixed reference, since the output shaft of the rotary valve actuator is directly connected to the valve member.

It is known in the art to couple a position indicator to the output shaft of the rotary valve actuator for pointing in one direction corresponding to the open state of the valve and another direction for the closed state. However, prior art devices are difficult to see from a distance. Moreover, they can only be viewed from a limited number of directions. Also, prior art valve position indicators are not readily adaptable for mounting on rotary actuators having shafts of varying length, shape and angular disposition. For successful mounting and use, prior art position indicating devices require shims, brackets and seals to accommodate different shaft heights and diameters and realignment of the rotary actuator output shaft to accommodate any angular misalignment.

SUMMARY OF THE INVENTION

The aforementioned problems of the prior art are overcome by the instant invention which provides for an apparatus for determining the position of the rotary valve member.

A valve position indicator in accordance with the invention has a stator which is fixedly mounted on a rotary valve actuator housing and a rotor which is rotatably mounted on the stator and fixedly connected to the rotary valve actuator output shaft which is directly connected to the rotary valve member. The rotor is connected to the output shaft by an adapter key. The adapter key couples to the rotary actuator output shaft which can vary in diameter and height. The rotor rotates with the actuator output shaft as the valve member is turned through an arc of approximately ninety degrees between open and closed dispositions of the rotary valve.

The stator, which is in the form of a stepped cylinder has an upwardly extending cylindrical wall having an enlarged diameter at a lower section thereof and a smaller diameter section above the lower section. Within a lower portion of the upper section of the stator there are two diametrically opposed rectangular windows. Within an upper portion of the upper section of the stator wall there are two additional diametrically opposed windows which are angularly displaced by ninety degrees from the windows in the lower portion. The windows in the upper portion penetrate an upper end wall of the stator to enable viewing through the stator from an axial direction above the control valve.

The rotor has an inner member in the form of a hollow cylinder with a solid wall and an outer member or sheath in the form of a stepped cylinder with an enlarged lower section having a solid wall and a smaller diameter upper section having a cylindrical wall with windows corresponding to the windows in the stator. The inner cylinder and outer sheath of the rotor are connected to an upper end wall of the rotor. The rotor is mounted on the stator with the cylindrical wall of the stator upper section disposed in a space between the rotor inner cylinder and the rotor outer sheath. A cylindrical ring circumscribes a bottom end of the sheath and a transparent cover is fixedly mounted over the rotor sheath above the ring.

The rotor and stator are preferably of contrasting colors with the rotor being solid black and the stator being a bright yellow or other highly visible color. The rotor may be rotated relative to the stator to a position where all four windows of the rotor sheath are in registration with the corresponding four windows of the stator upper section wall whereat the black solid cylindrical wall of the rotor inner cylinder is visible through the windows in the rotor sheath and stator. Rotation of the rotor by ninety degrees places the windows in the rotor shaft completely out of registration with the windows in the stator so that only solid portions of the stator wall are visible through the rotor windows. The brightly colored portions of the stator can be seen from both radial and axial directions.

A sensor module on the stator can detect magnetic, ferromagnetic or nonmagnetic target plates in the ring, and in the transparent cover, respectively. The target plates may be provided in two diametrically opposed pairs at different elevations. The sensors in the module are vertically disposed one above the other so that the upper one of the two sensors will respond to an adjacent one of the target plates in the cover and the other sensor will respond to an adjacent one of the target plates in the ring, at a lower elevation, the plates in the ring being displaced ninety degrees from the plates in the cover. This arrangement enables electrical signals to be generated indicating the disposition of the rotor relative to the stator and, hence, whether the rotary valve is opened or closed.

It is therefore an object of the invention to provide an apparatus for determining the position of a rotary valve actuator which has a mechanical indicator that is readily visible from all sides as well as above.

Another object of the invention is to provide an apparatus for determining the position of a rotary valve actuator which has a mechanical indicator that is readily visible from a distance.

Still another object of the invention is to provide an apparatus for determining the position of a rotary valve actuator which can actuate an electrical circuit for producing an electrical signal indicative of the rotary valve actuator position.

A further object of the invention is to provide an apparatus for determining the position of a rotary valve actuator which can readily accommodate output shafts having different shaft heights and diameters without the need for shims, brackets or seals.

Still a further object of the invention is to provide an apparatus for determining the position of a rotary valve actuator which can withstand contamination, moisture and temperature extremes.

A further object of the invention is to provide an apparatus for determining the position of a rotary valve actuator which can readily accommodate misalignment of the actuator output shaft without realigning the output shaft of the rotary valve actuator.

The invention provides direct indication of whether or not the rotary valve is open or closed because the output shaft of the rotary valve actuator is directly connected to the rotary valve member.

Other and further objects of the invention will be apparent from the following drawings and description of a preferred embodiment of the invention in which like reference numerals are used to indicate like parts in the various views.

DESCRIPTION OF THE PREFERRED EMBODIMENT

Figure 1:
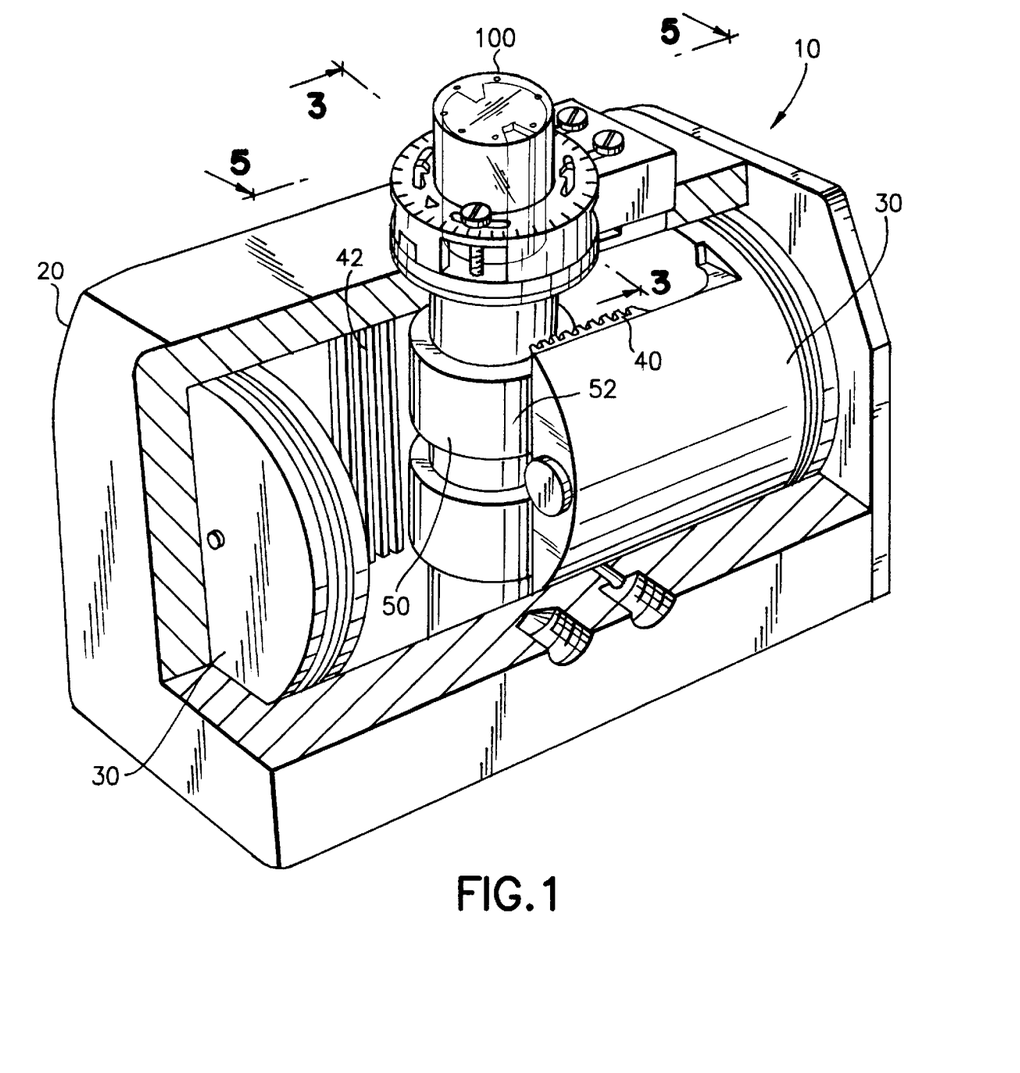
FIG. 1 is a perspective view of an apparatus for determining the position of a rotary valve actuator in accordance with the preferred embodiment of the invention in its intended environment.

Referring now to FIG. 1 of the drawings there is shown a rotary valve actuator 10 having a housing 20 in which there are slideably mounted two pistons 30 each with a longitudinal rack 40 having teeth 42 which mesh with the teeth 52 on the gears 50 circumscribing an output shaft 60 of a rotary valve actuator. Mounted atop the output shaft 60 is a position indicator 100 for providing a visible indication of the position of the output shaft 60. Since the output shaft 60 is directly connected to the rotary valve member, the position indicator 100 shows whether the rotary valve is open or closed.

Figure 2:
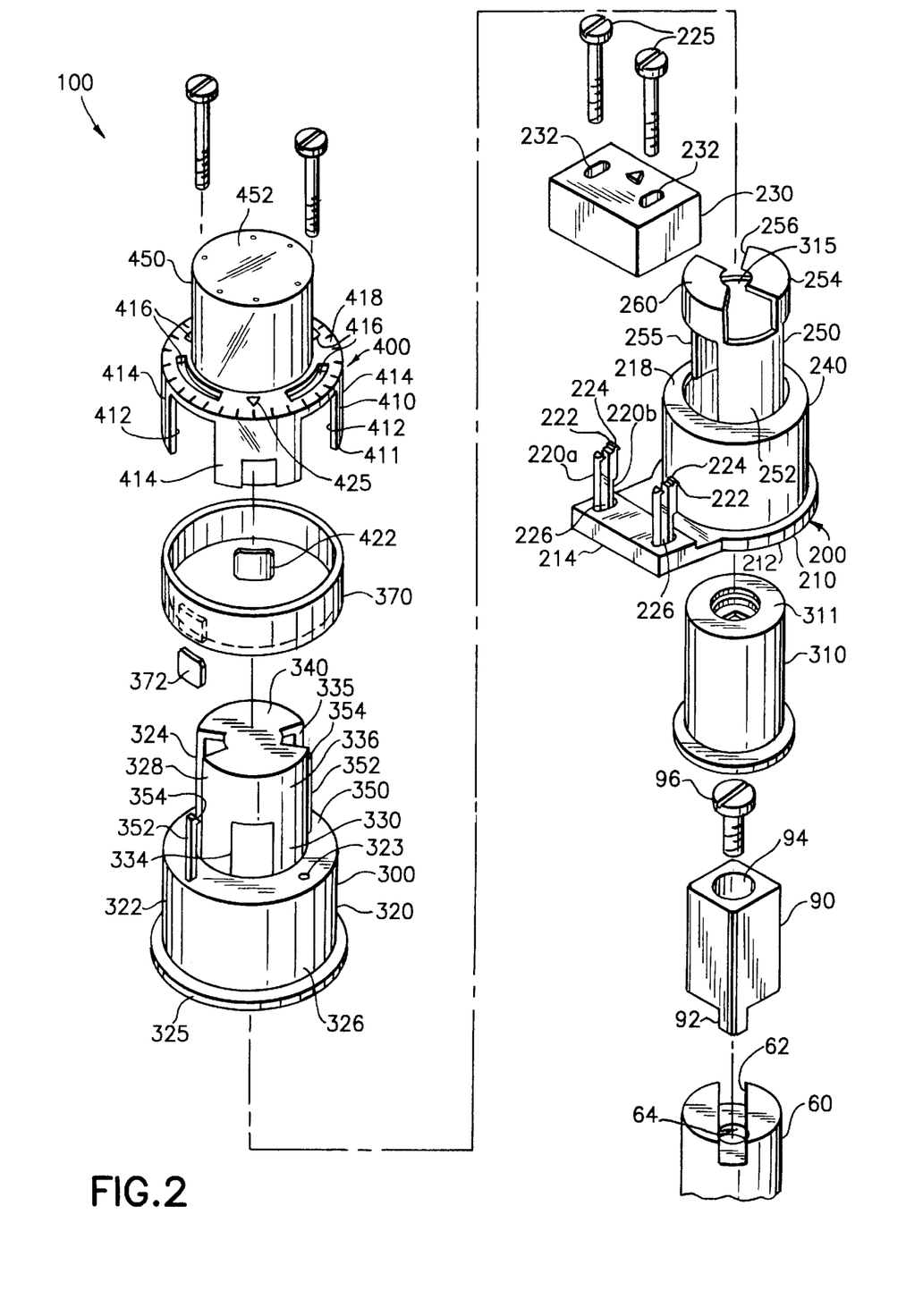
FIG. 2 is an exploded perspective view of an apparatus for determining the position of a rotary valve actuator in accordance with the preferred embodiment of the invention.

Referring now to FIG. 2, a valve position indicator 100 in accordance with the preferred embodiment of the invention has a stator 200, a rotor 300, a ring 370, and a cover 400. The stator 200 has a base 210 with a generally circular portion 212 and an integral rectangular platform 214 extending laterally thereof. Extending upwardly from the rectangular portion of the stator base 210 are two pairs of spaced parallel resilient arms 220a,b which can be received in corresponding slots 232 of a sensor module 230. The arms 220a,b can be deflected toward one another for being received within the slots 232 as the module 230 is lowered onto the base 210. Barbs 222 on the uppermost extremities of the arms 220b are provided to retain the module 230 on the base 210. The barbs 222 have cam surfaces 224 which cause them to move horizontally thereby deflecting the arms 220b from their normal vertical positions toward the respective arms 220a as the module 230 is lowered onto the base 210 with the barbs 222 rubbing against the inner surfaces of the module 230 within the slots 232. Once the barbs 222 clear the slots 232, the resilient arms 220 are restored to their normal upright positions where they retain the module 230 on the base 210.

Between each pair of arms 220a,b is an open space leading to respective apertures 226 within the platform 214 of base 210. The module 230 is held in place by two screws 225 which are passed through channels between with arms 220a,b within the slots 232 in the module 230, and through the apertures 226 for being threaded into holes in the housing.

The stator 200 is in the form of a hollow stepped cylinder and has a lower section 240 and an upper section 250 which meet at a shoulder 218. The upper section 250 of the stator 200 has a diameter less than the lower section 240 of the stator 200.

The upper cylindrical section of the stator 200 has a lower portion 252 with two diametrically opposed windows 255 and an upper portion 254 with two diametrically opposed windows 256 which are angularly displaced by ninety degrees from the windows 255 of the stator upper section lower portion 252. The upper section 250 of the stator 200 has an end wall 260 transverse to the stator axis, in which there are openings integral with the windows 256 in the stator upper section upper portion 254.

The rotor 300 has an internal cylinder 310, with a cylindrical wall that constitutes an inner cylindrical wall of the rotor 300, rotatably disposed within the stepped cylinder of the stator 200 and an outer shroud 320 in the form of a stepped cylinder which is fixedly connected to the rotor 300 internal cylinder 310 within an aperture 315 in the center of the end wall 260 of the upper section 250 of the stator 200.

The shroud 320 has a lower cylindrical section 322 which meets an upper cylindrical section 324 having a diameter less than the diameter of the lower cylindrical section 322 of the shroud 320 at a shoulder 350. At the lower end of the lower section 322 of the shroud 320 is a circular flange 325 which provides a supporting upper surface for the ring 370 as will hereinafter be explained.

The lower section 322 of the shroud 320 has a solid cylindrical wall 326. The upper section 324 of the shroud 320 has a cylindrical wall 328 with a lower portion 330 in which there are formed diametrically opposed windows 334, and an upper portion 336 having diametrically opposed windows 335 displaced ninety degrees from the lower portion diametrically opposed windows 334. Like the windows 256 in the stator 200, the windows 335 in the shroud 320 open into an upper end wall 340 of the shroud 320. The windows 255 in the stator 200 each have an arc width of less than ninety degrees. The windows 335 in the shroud 320 each have an arc width less than or equal to the arc width of the corresponding windows within the stator 200.

Figure 3:
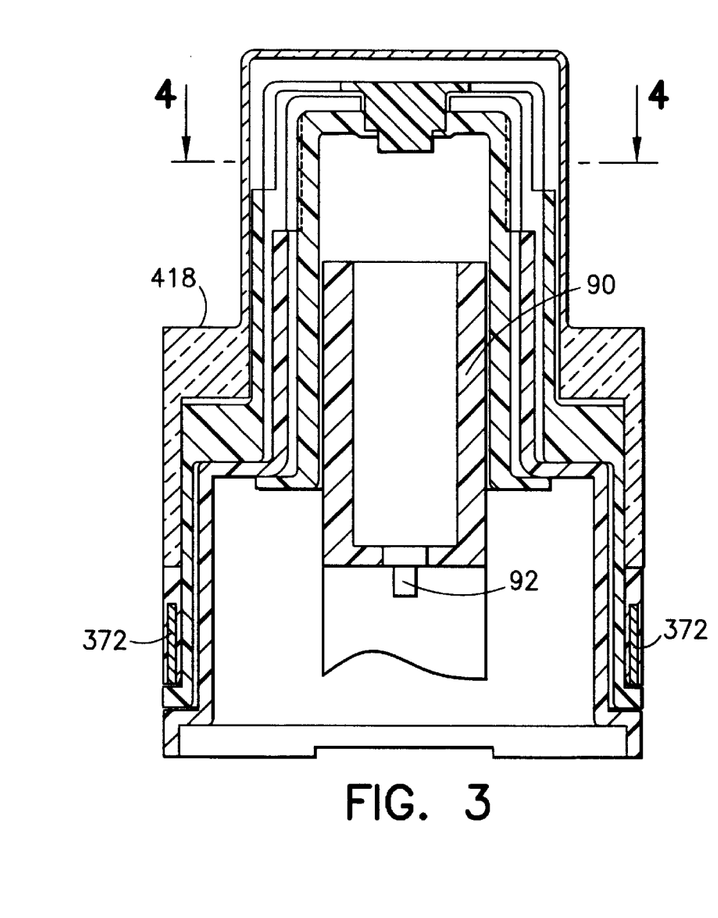
FIG. 3 is a sectional elevation view of an apparatus for determining the position of a rotary valve actuator, in a first disposition, taken through line 3—3 of FIG. 1.
Figure 4:
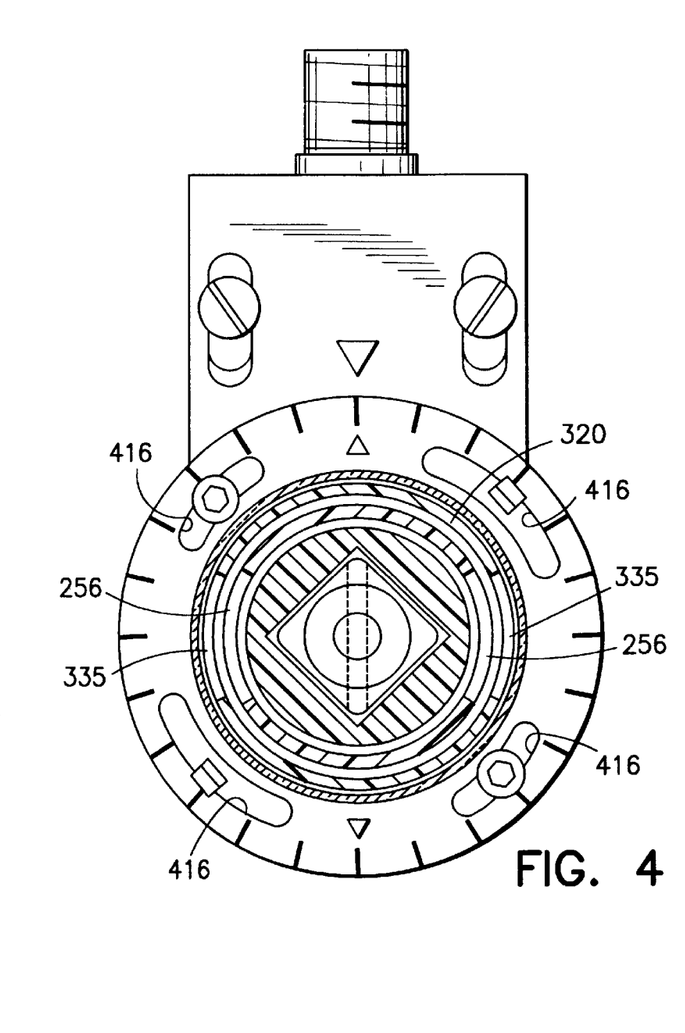
FIG. 4 is a top sectional plan view of an apparatus for determining the position of a rotary valve actuator, in the first disposition, taken through line 4—4 of FIG. 3.
Figures 5, 11:
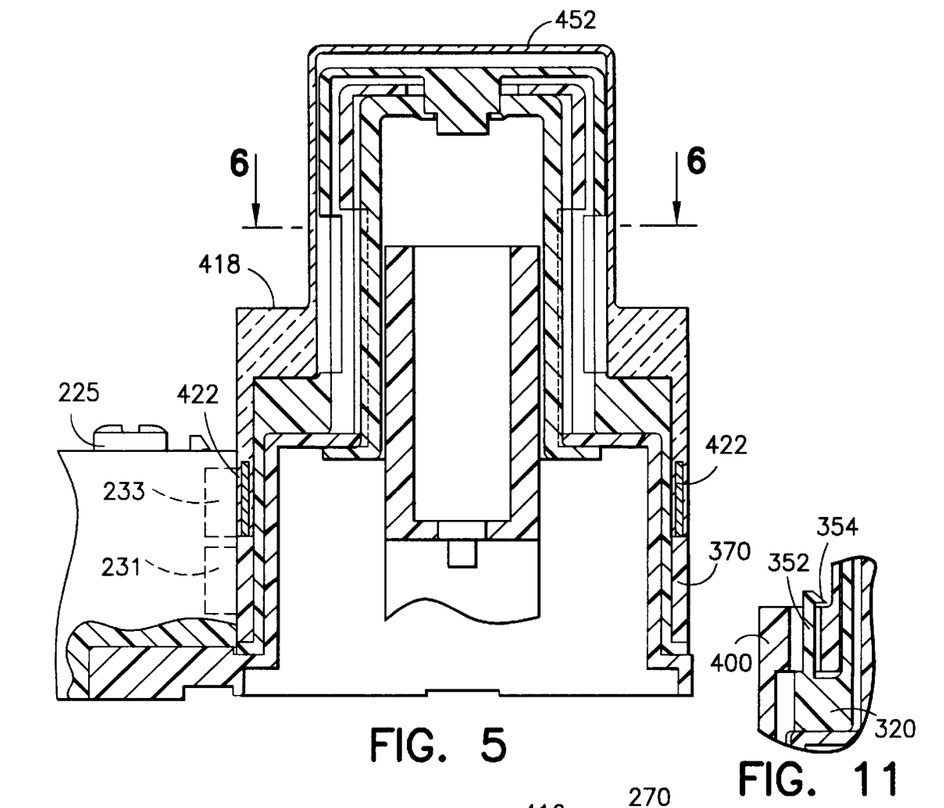
FIG. 5 is a sectional elevation view of an apparatus for determining the position of a rotary valve actuator, in the first disposition, taken through line 5—5 of FIG. 1.
FIG. 11 is a fragmented sectional elevation view of a part of an apparatus for determining the position of a rotary valve actuator taken through line 11—11 of FIG. 6.
Figure 6:
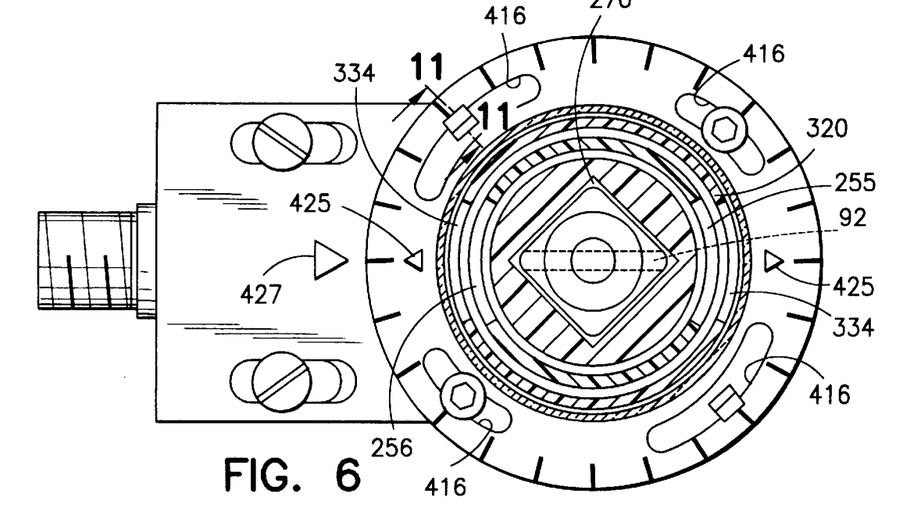
FIG. 6 is a top sectional plan view of an apparatus for determining the position of a rotary valve actuator in the first disposition, taken through line 6—6 of FIG. 5.
Figure 7:
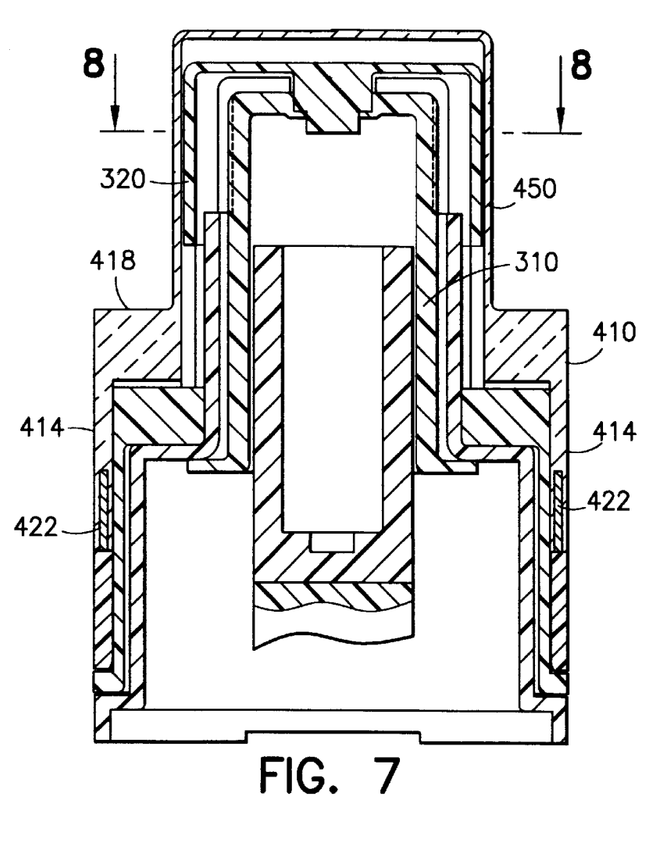
FIG. 7 is a sectional elevation view of an apparatus for determining the position of a rotary valve actuator similar to the view of FIG. 6 but with the invention in a second disposition.
Figure 8:
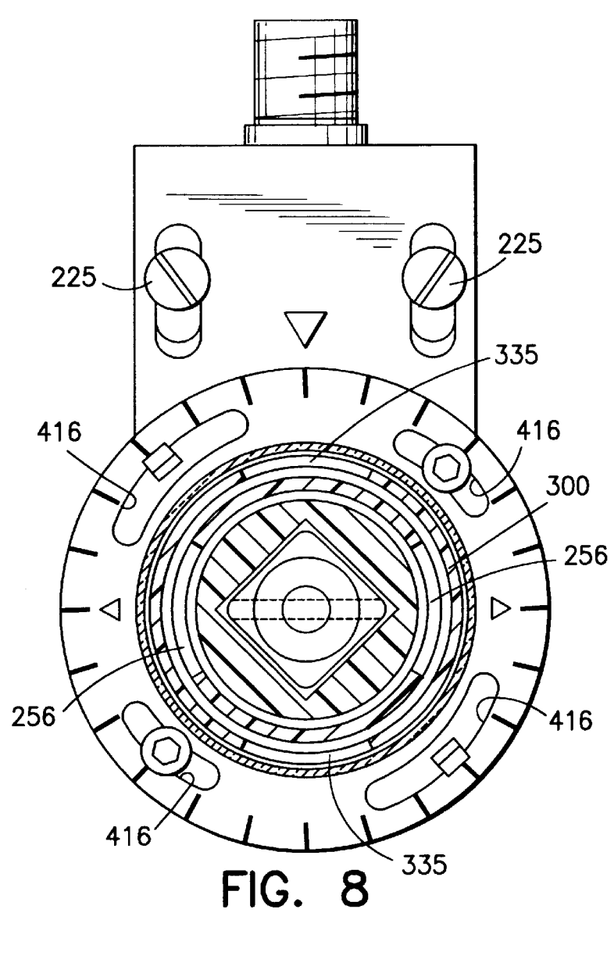
FIG. 8 is a top sectional plan view of an apparatus for determining the position of a rotary valve actuator, in the second disposition, taken through line 8—8 of FIG. 7.
Figure 9:
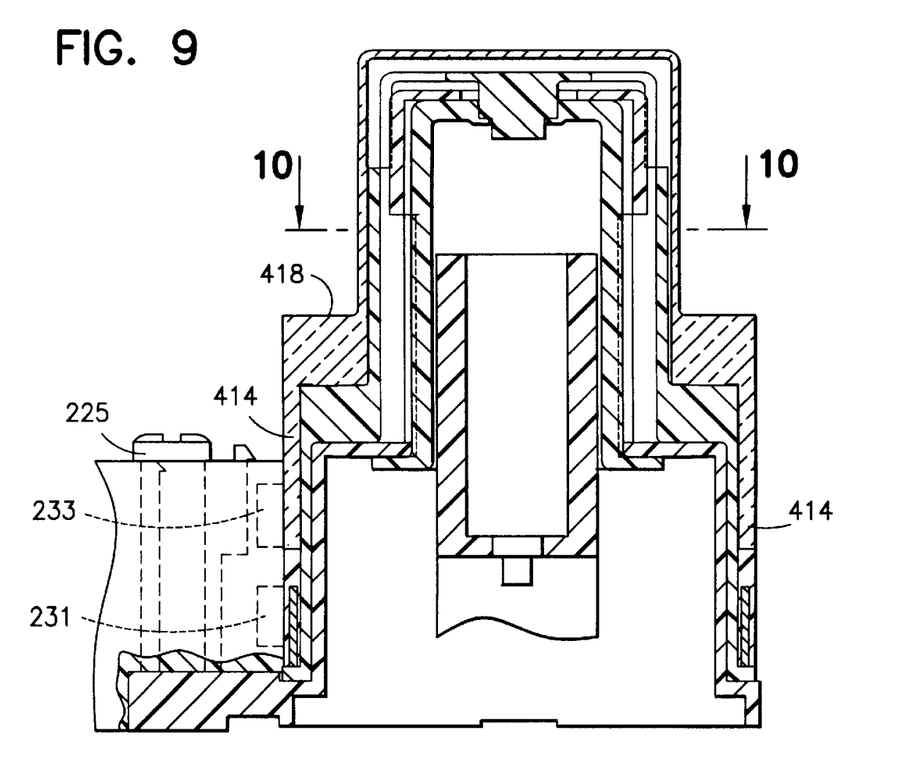
FIG. 9 is a sectional elevation view of an apparatus for determining the position of a rotary valve actuator similar to the view of FIG. 5 but with the invention in the second disposition.
Figure 10:
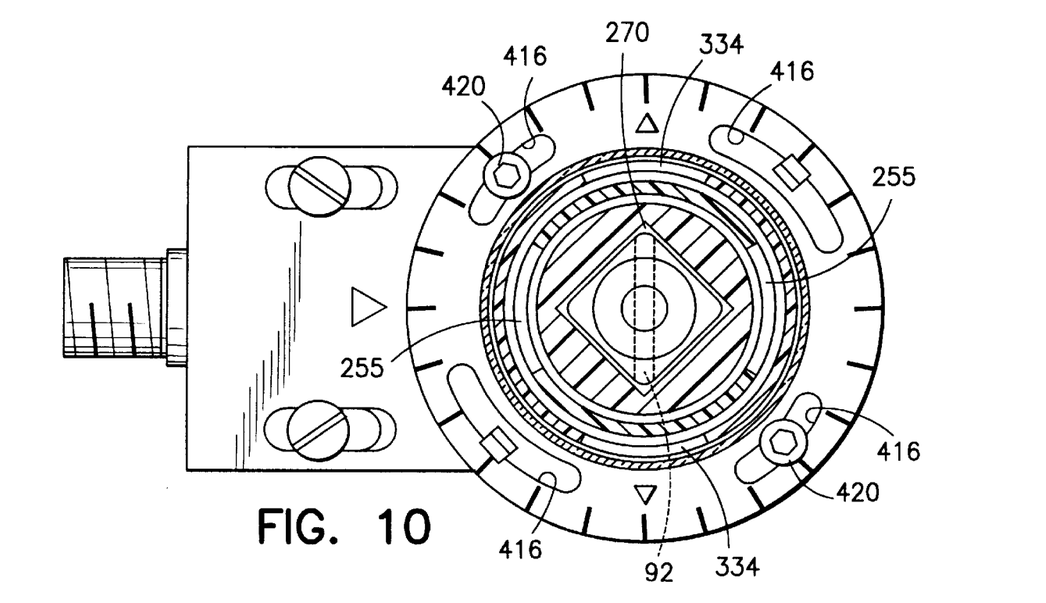
FIG. 10 is a top sectional plan view of an apparatus for determining the position of a rotary valve actuator in the second disposition, taken through line 10—10 of FIG. 9.

In FIGS. 3, 4, 5, and, 6 the lower and upper windows 334, 335 of the rotor shroud 320 are in alignment with the corresponding lower and upper windows 255, 256 of the stator. In FIGS. 7, 8, 9, and 10, the rotor 300 is turned ninety degrees from its position in FIGS. 3, 4, 5 and 6 so that the windows 255, 256 of the stator 200 and the windows 334, 335 of the rotor shroud 320 are respectively ninety degrees apart. In this position, the bright yellow cylindrical wall of the upper section of the stator is clearly visible through the windows 334, 335 of the rotor shroud 320.

Extending upwardly from the shoulder 350 at the interface of the shroud upper section 324 and lower section 322 are two diametrically opposed resilient arms 352 which are parallel to the central axis of the cylindrical shroud 320 and have at their uppermost ends, radially inwardly extending barbs 354.

The cylindrical ring 370 has an inner diameter substantially equal to the outer diameter of the outer cylindrical wall of the lower section 322 of the shroud 320 and an outer diameter substantially equal to the outer diameter of the flange 325 at the bottom of the shroud 320. The ring 370 has an axial height less than the axial height of the lower section 322 of the shroud 320 measured between the upper surface of the flange 325 and the shoulder 350. The ring 370 is snugly fitted over the lower section 322 of the shroud 320 and seated on the flange 325. Until secured, as will hereinafter be explained, the ring 370 may be rotated relative to the shroud 320. Disposed within the cylindrical wall of the ring 370 mounted on the rotor 300, at respective diametrically opposed positions, are two respective targets in the form of ferromagnetic plates 372 which can be detected when moved proximate to a magnetic sensor. The inner diameter of the ring 370 has a slight taper which matches the taper of the lower section 322 of the shroud 320. The taper allows the ring 370 to be assembled in one position only, so that the openings to the slots which house the ferromagnetic plates 372 are in contact with the flange 325. This effectively traps the ferromagnetic plates 372 in the ring 370.

The cover 400, which is in the form of a stepped cylinder, is made from a transparent plastic. The cover 400 has a lower cylindrical section 410 with an open end 411 and an upper cylindrical section 450 with a closed end 452. The upper cylindrical section of the cover 400 has an outer diameter less than the outer diameter of its lower cylindrical section 410. Four equiangularly spaced rectangular notches 412 of equal size, are formed in the lower section 410 of the cover 400 and define four rectangular arcuate fingers 414 therebetween. The inner diameter of the lower section 410 of the cover 400 is substantially equal to the inner diameter of the ring 370 and the outer diameter of the lower section 322 of the shroud 320. The inner diameter of the upper section of the shroud 320 is just slightly greater than the outer diameter of the upper section 250 of the stator 200. The inner diameter of the lower section 322 of the shroud 320 is slightly greater than the outer diameter of the lower section 240 of the stator 200. The axial distance from the upper end wall 340 of the shroud 320 to the shoulder 350 of the shroud 320 is slightly less than the axial distance from the upper end wall 260 of the upper section 250 of the stator 200 to the stator shoulder 218. This enables the shroud 320 to the fitted over and rotated relative to the stator 200.

The inner diameter of the upper section 450 of the cover 400 is slightly greater than the outer diameter of the upper section of the shroud 320. The inner diameter of the lower section 410 of the cover 400 is slightly greater than the outer diameter of the lower section 322 of the shroud 320. The axial height of the fingers 414 is slightly greater than the distance from the top of the ring 370 when it is seated on the flange 325 to the shroud 320 shoulder 350 so that the cover 400 can be fitted over the shroud 320 with the bottom end surfaces of the fingers 414 in engagement with the upper edge of the ring 370.

The cover 400 has four equally spaced arcuate slots 416 in its shoulder 418. Two diametrically opposite slots 416 receive screws 420 which can be threaded into apertures 323 in the shoulder 350 of the shroud 320. The remaining two diametrically opposite slots 416 receive the arms 352. Before the screws 420 are tightened, the cover 400, ring 370 and rotor 300 may each be rotated relative to one another, with the screws 420 limiting to the arc length of the slots 416, rotation of the cover 400 relative to the shroud 320. Once the relative dispositions of the cover 400, ring 370 and rotor 300 are set as desired, the screws 420 may be tightened to prevent further rotation of the rotor 300, ring 370, and cover 400 relative to one another, whereby the cover 400, ring 370, and rotor 300 are all rotatable as a unit relative to the stator 200.

As can be seen in FIG. 11, the barbs 354 on the arms 352 extending upwardly from the shoulder 350 of the shroud 320 overlie the shoulder 418 of the cover 400 to prevent the cover 400 from being separated from the rotor 300 while permitting relative rotation of the rotor 300 with respect to the cover 400 within the arc length of each of the slots 416. With the screws 420 removed, the cover 400 and shroud 320 may be separated by gently pressing the barbs 354 on the arms 352 radially outwardly until the barbs 354 can be passed through their respective slots 416.

Within two diametrically opposed fingers 414 of the cover 400 there are disposed respective targets in the form of target plates 422 which like the target plates 372 of the ring 370 can be sensed by a magnetic sensor.

Disposed within the module 230 are two magnetic sensors 231, 233 vertically disposed one above the other. With the rotor 300 mounted on the stator 200, the ferromagnetic plates 372 within the ring 370 are at the same axial height as the lower sensor 231. With the rotor 300 rotatably mounted on the stator 200, and the cover 400 mounted on the rotor 300, the ferromagnetic plates 422 within the fingers 414 are at an elevation substantially equal to the height of the upper sensor 233.

A rectangular, preferably square, axial bore 270 in the bottom of the rotor inner cylinder 310 can receive an adapter key 90 in the form of a rectangular parallelopiped having at its bottom end a diagonal tongue 92 which is dimensioned to be received within a slot 62 at the upper end of the actuator output shaft 60. The key 90 has a hollow circular bore 94 which extends through the tongue 92 for receiving a screw 96 that can be threaded into an aperture 64 in the slot 62 in the actuator output shaft 60. A circular shoulder is provided within the hollow bore 94 of the key 90 so that the head of the screw 96 may be recessed within the bore 94 of the key 90. The adapter key 90 is mounted between the rotor inner cylinder 310 and actuator output shaft 60 for transmitting torque from the actuator output shaft 60 to the rotor inner cylinder 310. The dimensions of the key 90 are a function of distance between, and dimensions of, the rotor inner cylinder 310 and actuator output shaft 60.

The angle of rotation of the actuator output shaft 60 between a position at which the valve is fully opened to a position at which the valve is fully close is normally ninety degrees.

The rotor 300 and stator 200 are preferably each made of a solid colored material, the respective colors of the rotor 300 and stator 200 being contrasting. In a preferred embodiment of the invention the rotor 300 is black and the stator 200 is a high reflectance yellow. When the rotor 300 is rotated relative to the stator 200 so that the windows of the shroud 320 are in registration with the windows of the stator 200, the outer cylindrical wall of the inner cylinder 310 is visible through all of the windows of the shroud 320 and stator 200, when viewed from a direction transverse to the axis of the rotor 300 and stator 200. When viewed from above, the openings in the upper end wall 340 of shroud 320 are in registration with the windows 256 in the upper portion 254 of the upper section 250 of the stator 200. In this position, the upper wall 340 of the shroud 320 and the upper wall 311 of the internal cylinder 310, both of which are preferably black, can be readily seen. Hence, whether viewed from the side or above, the indicator 100 appears to be entirely black when the windows of the stator 200 and rotor 300 are in registration.

When the rotor 300 is rotated by ninety degrees from its former position, the windows of the shroud 320 are ninety degrees out of alignment with the windows in the stator 200. In this disposition, the cylindrical wall of the upper section 250 of the stator 200 is visible through the window in the lower portion 330 of the upper section of the shroud 320. With the indicator 100 viewed from above in the same disposition, the upper end wall of the stator 200 is clearly visible through the openings in the upper end wall 340 of the shroud 320. Hence irrespective of the lateral direction, or whether viewed from the side or above, the brightly colored stator can be readily seen through the windows of the shroud 320.

In use, the indicator 100 is assembled with the rotor 300 and internal cylinder 310 fixedly connected with the stator 200 between them and the module 230 mounted on the base 210. The ring 370 and cover 400 are mounted on the rotor 300. The screws 225 which are used to secure the module 230 to the base 210 are also used to secure the indicator 100 to the housing 20.

The indicator 100 is installed onto the rotary valve actuator 10 in the following manner. First, the key 90 is affixed to the output shaft 60 by installing the tongue 92 into the slot 62 and affixing the screw 96 into the aperture 62. With the screws 420 loosened, the indicator 100 is adjusted so that the windows 255 and 256 in the stator 200 are in registration with the windows 334 and 335 in the shroud 320 of the rotor 300. In this position, the indicator 100 appears to be totally black. One of the target plates 422 in the cover 400 can be visually aligned with the upper sensor 233 with the aid of an index arrow 425 on the cover 400 and an index reference 427 on the module 230. The indicator 100 is then installed so that the key 90 slides into the axial bore 270 of the internal cylinder 310. The indicator 100 is then affixed to the actuator housing 20 by means of the screws 225. Visually, the indicator 100 is totally black providing an indication that the actuator is in the closed position. When electrical power is applied to the module 230, the upper sensor 233 provides an electrical indication, which can be detected at a distant site through the provision of suitable wiring or telemetry as will be known to those skilled in the art, that the actuator is in the closed position. Since the output shaft 60 is directly connected to the valve member, direct indication that the rotary valve is in the closed position is achieved.

The indicator 100 is so designed that minor angular displacements of the output shaft 60 can be accommodated without realigning the actuator 10 itself. With screws 420 still loosened, the position of the cover 400 and the target plate 422 can be repositioned within the arc length of the slots 416 to insure the ferromagnetic plate 422 is optimally aligned with the upper sensor 233 of the module 230 at a position of nearest proximity. Once aligned, the distance between the target plate 422 and corresponding sensor 233 at the position of nearest proximity remains a constant dimension without need for further adjustment.

When the rotary valve actuator 10 is moved to the open position, the output shaft 60 rotates approximately ninety degrees thereby moving the inner cylinder 310 and the rotor 300 into a position whereby the windows 255 and 256 in the stator 200 are no longer in registration with windows 334 and 335 of the shroud 320 of the rotor 300. In this position, the yellow cylindrical wall of the upper portion of the stator is clearly visible through the windows 334 and 335 of the shroud 320. With the output shaft 60 in the open position, the appearance of the bright yellow color of the stator 200 through the windows of the shroud 320 provides a visual indication the rotary valve actuator 10 and the rotary valve are in the open position. The target plate 422 in the cover 400 is no longer in alignment with the upper sensor 233 in the module 230. One of the target plates 372 of the ring 370 can be adjusted so that it is proximate the lower sensor 231 in the module 230. Once aligned, the distance between each target plate 372 and corresponding sensor 231 at the position of nearest proximity remains a constant dimension without need for further adjustment. When electrical power is applied to the module 230, the lower sensor 231 provides an electrical indication that the rotary valve actuator 10 and the rotary valve are in the open position. When the screws 420 are tightened, the cover 400, ring 370, internal cylinder 310 and rotor 300 are all rotatable as a unit relative to the stator.

If the rotary valve were to be stuck between its fully open and fully closed positions, a demarcation line between the bright portion of the stator 200 and the dark cylinder of the rotor 300 would be visible through the windows in the shroud 320 of the rotor 300. Moreover, neither of the upper and lower sensors 231 and 233 within the module 230 would detect an adjacent target plate thereby resulting in the absence of an electrical signal indicating that the rotary valve was fully open or fully closed. In response to the absence of a signal, a warning could be generated indicating an improperly working rotary valve.

It is to be appreciated that the foregoing is a description of the preferred embodiment of the invention to which variations and modifications may be made without departing from the spirit and scope of the invention. For example, additional target plates may be placed along the circumference of the cover 400 and/or ring 370 for signaling intermediate positions of the output shaft 60 between fully open and fully closed positions. Additional contrasting colors may be used for the stator 200, rotor 300 and internal cylinder 310. Also the rotor inner cylinder 310 can directly receive the shaft of a valve, e.g., a manual valve, or the shaft of a valve actuator, without the aid of a key if the rotor and shaft dimensions and distances are appropriately selected.

What is claimed is:

1. A position indicator for indicating the position of a rotary valve actuator output shaft which is connected to a valve shaft for being rotatable about an axis in an actuator housing between an open position at which fluid flow through the valve is enabled and a closed position at which fluid flow through the valve is disabled, comprising, a stator having a cylindrical wall with a central axis, and means for fixedly mounting the stator on the actuator housing in axial alignment with the actuator output shaft, a rotor having an inner cylindrical wall, a coaxial outer cylindrical wall, there being a cylindrical space between said rotor inner cylindrical wall and said rotor outer cylindrical wall, and an end wall connecting the rotor inner cylindrical wall and rotor outer cylindrical wall, the rotor being rotatably mounted on the stator with the rotor end wall transverse to the stator axis, the rotor inner cylindrical wall intermediate the stator axis and stator cylindrical wall and the stator cylindrical wall in the space intermediate the rotor inner cylindrical wall and rotor outer cylindrical wall, the rotor further having connecting means for fixing the rotor to the actuator output shaft in coaxial relationship therewith, the stator cylindrical wall having an opening forming a first stator window, the rotor outer cylindrical wall having an opening forming a first rotor window which is in registration with the first stator window for obscuring the stator cylindrical wall and exposing the rotor inner cylindrical wall when the actuator output shaft is in one of the open and closed positions and the first rotor window being out of registration with the first stator window for exposing the stator cylindrical wall and obscuring the rotor inner cylindrical wall when the actuator output shaft is in the other of the open and closed positions.

2. A position indicator in accordance with claim 1 wherein the stator cylindrical wall has a second opening forming a second stator window diametrically opposite the first stator window, and the rotor outer cylindrical wall has a second opening forming a second rotor window diametrically opposite the first rotor window, and the second rotor window being in registration with the second stator window for obscuring the stator cylindrical wall and exposing the rotor inner cylindrical wall when the actuator output shaft is in said one of the open and closed positions and the second rotor window being out of registration with the second stator window for exposing the stator cylindrical wall and obscuring the rotor inner cylindrical wall when the actuator output shaft is in said other of the open and closed positions.

3. A position indicator in accordance with claim 1 wherein the stator cylindrical wall and end wall have, at their intersection, a third stator opening forming a third stator window angularly displaced and axially offset from the first stator window, and the rotor outer cylindrical wall and end wall have, at their intersection, a third rotor opening forming a third rotor window angularly displaced and axially offset from the first rotor window, the third rotor window being in registration with the third stator window for obscuring the stator cylindrical wall and exposing the rotor inner cylindrical wall and rotor end wall when the actuator output shaft is in said one of the open and closed positions and the third rotor window being out of registration with the third stator window for exposing the stator cylindrical wall and obscuring the rotor inner cylindrical wall and rotor end wall when the actuator output shaft is in said other of the open and closed positions.

4. A position indicator in accordance with claim 1 further comprising electrical sensor means mounted on one of the stator and rotor, and first target means to which said sensor means is responsive mounted on the other of said stator and rotor, said target means occupying a position of nearest proximity to said sensor means when said rotor first window is in registration with said stator first window for causing said sensor means to produce a signal indicative of the position of said actuator output shaft.

5. A position indicator in accordance with claim 4 wherein the distance between said target means and said sensor means at said position of nearest proximity is a constant dimension.

6. A position indicator in accordance with claim 4 further comprising first target support means, for supporting said first target means, rotatably mounted on said rotor, said first target means being fixedly mounted on said first target support means, and securing means for selectively permitting rotation of said first target support means relative to said rotor for aligning said first target means with said sensor means and then preventing rotation of said first target support means relative to said rotor for causing said first target means to rotate with said rotor relative to said stator.

7. A position indicator in accordance with claim 1 further comprising electrical sensor means mounted on one of the stator and rotor, and target means, to which said sensor means is responsive, mounted on the other of said stator and rotor, said target means occupying a position of nearest proximity to said sensor means when said rotor first window is out of registration with said stator first window.

8. A position indicator in accordance with claim 7 further comprising first target support means, for supporting said first target means, rotatably mounted on said rotor, said first target means being fixedly mounted on said first target support means, and securing means for selectively permitting rotation of said first target support means relative to said rotor for aligning said first target means with said sensor means and then preventing rotation of said first target support means relative to said rotor for causing said first target means to rotate with said rotor relative to said stator.

9. A position indicator in accordance with claim 1 further comprising first electrical sensor means mounted on one of the stator and rotor, first target means, to which said sensor means is responsive, mounted on the other of said stator and rotor, for causing said sensor means to produce a signal indicative of one position of said actuator output shaft, and second target means to which said sensor means is responsive mounted on the other of said stator and rotor and angularly displaced from said first target means, for causing said sensor means to produce a signal indicative of another position of said actuator output shaft.

10. A position indicator in accordance with claim 9 further comprising first target support means, for supporting said first target means, rotatably mounted on said rotor, said first target means being fixedly mounted on said first target support means, and second target support means, for supporting said second target means, rotatably mounted on said rotor, said second target means being fixedly mounted on said second target support means, and securing means for selectively permitting rotation of said first target support means and said second target support means relative to one another and to said rotor for aligning said first target means and second target means with said sensor means at respective positions of said actuator output shaft and then preventing rotation of said first target support means and second target support means relative to said rotor for causing said first target means and second target means to rotate with said rotor relative to said stator.

11. A position indicator in accordance with claim 10 wherein said first target support means comprises a cylindrical ring circumscribing said rotor outer cylindrical wall, and said second target support means comprises a cover mounted over said rotor.

12. A position indicator in accordance with claim 11 wherein said cover is transparent for permitting viewing of said rotor and stator therethrough.

13. A position indicator in accordance with claim 11 wherein the ring is disposed between the cover and a portion of the rotor, and the securing means comprises a screw threaded into an aperture in the rotor which, when tightened, urges the cover and rotor against the ring for increasing friction between the cover and ring and between the rotor and ring sufficiently to prevent relative rotation between the cover rotor and between the ring and rotor.

14. A position indicator in accordance with claim 1 wherein the rotor has a first color and the stator has a second color different from the first color.

15. A position indicator in accordance with claim 14 wherein the first color is black and the second color is yellow.

16. A position indicator in accordance with claim 1 further comprising adapter key means mounted between the rotor and actuator output shaft for transmitting torque from the actuator output shaft to the rotor, the dimensions of the key means being a function of distance between and dimensions of the rotor and actuator output shaft.

17. A position indicator in accordance with claim 1 wherein said rotor comprises means for direct mounting on and rotation with the shaft of a valve or valve actuator.

* * * * *